US 8,179,791 B2

(12) United States Patent
Der et al.

(10) Patent No.: US 8,179,791 B2
(45) Date of Patent: May 15, 2012

(54) SEQUENTIALLY CALLING GROUPS OF MULTIPLE COMMUNICATION DEVICES BASED ON USER-SPECIFIED LISTS OF COMMUNICATION DEVICES HAVING ASSIGNED PRIORITIES

(76) Inventors: William C. Der, Dunstable, MA (US); Srinivasan N. Subbaiyan, Nashua, NH (US); Marc A. Greenberg, Holliston, MA (US)

( * ) Notice: Subject to any disclaimer, the term of this patent is extended or adjusted under 35 U.S.C. 154(b) by 1229 days.

(21) Appl. No.: 11/890,029

(22) Filed: Aug. 2, 2007

(65) Prior Publication Data
US 2008/0031436 A1  Feb. 7, 2008

Related U.S. Application Data
(60) Provisional application No. 60/835,364, filed on Aug. 3, 2006.

(51) Int. Cl.
*H04L 12/26* (2006.01)
(52) U.S. Cl. .......................................... 370/230; 379/69
(58) Field of Classification Search .......... 370/352–356, 370/231, 230.1, 466, 471; 379/88.17, 69, 379/230, 211.01, 221.03
See application file for complete search history.

(56) References Cited

U.S. PATENT DOCUMENTS
| | | | |
|---|---|---|---|
| 2002/0122547 A1* | 9/2002 | Hinchey et al. | 379/221.01 |
| 2003/0108176 A1* | 6/2003 | Kung et al. | 379/211.02 |
| 2005/0243974 A1* | 11/2005 | Pearson | 379/37 |
| 2007/0239685 A1* | 10/2007 | Howell et al. | 707/3 |
| 2007/0253407 A1* | 11/2007 | Wang et al. | 370/352 |

* cited by examiner

*Primary Examiner* — Chirag Shah
*Assistant Examiner* — Minh-Trang Nguyen
(74) *Attorney, Agent, or Firm* — Husch Blackwell LLP (57) ABSTRACT

The illustrative embodiment of the present invention provides a find-me service for VoIP. The find-me service allows a user to specify multiple communication devices. Further, the find-me service allows a callee to assign a priority to each communication device specified or in the alternative allows the callee to place the specified communication devices in prioritized lists. Multiple communication devices can have an identical priority level or can be placed in the same priority list. When the user is called, the call is processed by a software based call manager that initiates the find-me service. The call manager sends the call to all of the communication devices with the highest priority. This allows a single call to be sent to multiple communication devices simultaneously. If there is no answer at any of the communication devices the call manager sends the call to all of the communication devices on the list with the next sequential priority level.

8 Claims, 6 Drawing Sheets

SEQUENTIALLY CALLING GROUPS OF MULTIPLE COMMUNICATION DEVICES BASED ON USER-SPECIFIED LISTS OF COMMUNICATION DEVICES HAVING ASSIGNED PRIORITIES

RELATED APPLICATION

This application claims priority to U.S. Provisional Patent Application Ser. No. 60/835,364, filed Aug. 3, 2006, the contents of which are hereby incorporated by reference.

FIELD OF THE INVENTION

The present invention is related to a software-based voice over Internet protocol network, and is more specifically to a software-based find-me service that enables both parallel and sequential calling.

BACKGROUND

The conventional telephony network allows users to communicate with each other through a central system of switches, which can be referred to as a telephone exchange. The telephone exchanges provide electrical or optical switches to connect users and allow communication. The conventional telephony network is often referred to as a public switched telephone network (PSTN). The switches and other equipment necessary to make a connection can be located, for example, in central offices (COs) and in customer premises. The PSTN can have local exchanges that allow a user to call another user of the PSTN through COs of the local exchange. The PSTN can also have long lines that allow long distance call transmission, such that a user can call another user on the PSTN that is not part of the local exchange. In this case, the call may be routed through multiple COs until the call reaches the called party's local exchange.

Telephone service providers generally provide subscribing users of the PSTN with additional services. A service is an extension of basic call handling that provides for special treatment of the call at the originating end, the terminating end or both. Some examples of services are call forwarding, call transfer, three-way calling and caller ID. Many different types of services are created to provide ways for users to specially treat a call based on user preference. For example, users can choose to have their calls forwarded if they are away from their phone. A user may put a call on hold and transfer the call to another user.

An extension of the PSTN is a private branch exchange (PBX). A PBX is a circuit-switched, intra-enterprise switching system. Unlike the PSTN, the PBX provides a user of the PBX with the ability to call another user of the PBX without having to go through a CO. In this manner, a PBX provides a group of users of the PBX with their own exchange. For example, a corporation may have a PBX that allows the employees to call each other through the PBX. A PBX may also provide for the interaction of users of the PBX and external users. For example, a PBX may have outside line, which can also be referred to as trunk lines that connect to the PSTN, thereby allowing a user of the PBX to originate calls to users outside of the PBX and to receive calls from user outside of the PBX.

Telephone service providers that provide PBX service generally provide subscribing enterprises with additional services beyond those services available for PSTN subscribers. For example, a subscribing enterprise may have the option of receiving the services of forking and find-me.

Forking refers to a service that enables multiple phones, regardless of location, of a callee to receive the same call from a caller. For example, a callee can provide the telephone service provider with a list of phone numbers where the phone numbers correspond to, for example, the callee's office phone, home phone and cell phone. If the callee has the forking service, when a caller calls the callee, all of the phones referenced in the list receive the call and the callee can answer any of these phones to communicate with the caller.

A find-me service refers to a service that enables a callee to specify a list of phone numbers to the telephone service provider that can be called in sequence until the callee answers the call or the call times out. For example, the callee can specify that a call first be routed to the callee's office phone, then to the callee's cell phone and subsequently to the callee's home phone. In this case, when a caller calls the callee the call is routed to the callee's office phone. If the callee does not answer this phone within a certain amount of time, the call is rerouted to the callee's cell phone. If the callee does not answer the cell phone within a certain amount of time, the call is rerouted to the callee's home phone. In the case that the callee does not answer the home phone, the call may proceed to the callee's voice mail. If the callee answers the call with any of the phones, the call routing sequence is stopped.

In recent years, voice over Internet Protocol (VoIP) has provided an alternative to the conventional telephone exchanges. VoIP is a technology that allows a user to make telephone calls using an Internet connection instead of a conventional phone line and the conventional exchanges. VoIP uses the Internet as the transmission medium for telephone calls by sending voice data in packets using an Internet Protocol (IP) rather than by traditional circuit transmissions of the PSTN. A VoIP call may be carried by multiple routers over the Internet. VoIP is an attractive alternative to conventional telephony networks since a single network can be used to transmit both voice and data. Many organizations considering converging voice and data networks have found the costs of migrating to VoIP can outweigh the benefits. VoIP providers typically employ centralized PBX, provider-specific implementations that require expensive call servers and costly proprietary handsets.

Although VoIP providers typically provide services such as voice mail, caller ID, forking and call forwarding, the find-me service is unavailable. It is therefore desired that VoIP providers offer a find-me service to VoIP users. Further, it is desired that the find-me service provide greater flexibility than the find-me service offered to PBX users. Such flexibility can be the ability for a user to specify both parallel and sequential calling aspects.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Embodiments of the present invention provide a software-based find-me service for VoIP. The find-me service allows a user to specify multiple communication devices that can be contacted in sequence and in parallel. Further, the find-me service allows the user to assign a priority to each of the specified communication devices. Multiple communication devices can have an identical priority. Further embodiments of the present invention allow a user to specify lists of communication devices, where each list can have a priority and can include multiple communication devices. When a caller calls the user (callee), the call is processed by a software based call manager that initiates the find-me service. The call manager sends the call to all of the communication devices based on the specified priorities or on the list with the highest priority. In this manner, a single call can be sent to multiple communication devices simultaneously. If there is no answer at any of the communication devices the call manager sends the call to all of the communication devices with the next sequential priority level or to all of the communication devices in a list with the next sequential priority. A user can specify as many communication devices as desired and the process described above would continue until the call is answered by the callee or the call times out. It is therefore observed that the find-me service of the illustrative embodiment provides for both parallel calling and sequential calling.

Figure 1:
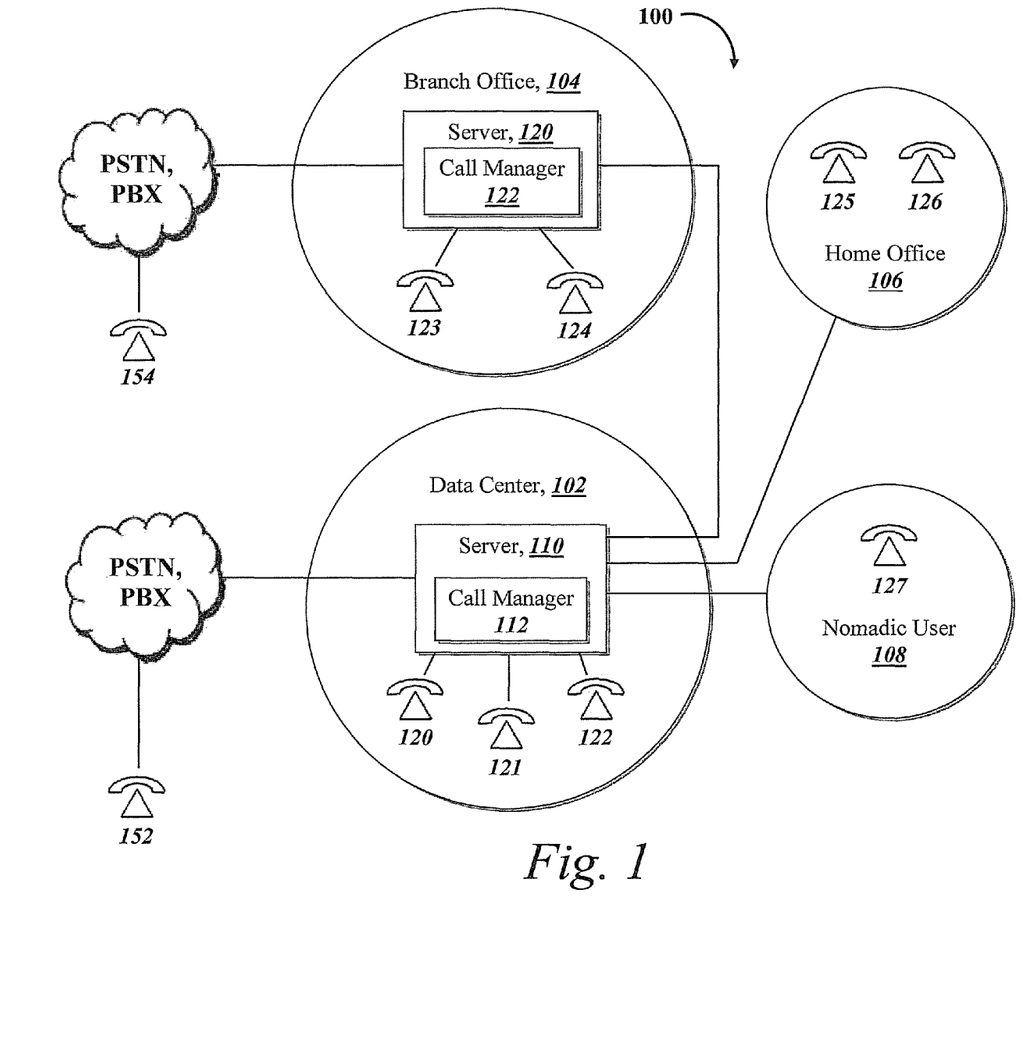
FIG. 1 depicts an example of a software based VoIP network that can be implemented for an enterprise in accordance with the present invention.

FIG. 1 depicts an example of an illustrative software based VoIP network 100 that can be implemented for an enterprise in accordance with the present invention. The VoIP network 100 includes a data center 102, a branch office 104, a home office 106 and a nomadic user 108.

Communication devices 120-127 can be a computing device that can originate and/or receive calls and can include a software-based phone. The communication devices can also be a SIP phone, a cellular phone, a PDA, laptop or any other device that is capable of receiving and/or originating a call in a VoIP network.

The data center 102 includes a server 110 with a call manager 112 loaded on the server 110, a communication device 120, a communication device 121 and a communication device 122. The server 110 is connected to each of the communication devices 120-122. The server 110 can also connect the PSTN and a PBX.

The call manager 112 is a computer program that controls communications among the communication devices 120-122 of the data center as well as between the communication devices of the data center and the branch office 104, the home office 106 and the nomadic user 108. The call manager 112 can, for example, allows the communication device 120 to call the communication device 121. The call manager 112 also enables the communication devices 120-121 to call phones on the PSTN and a PBX. The call manager can, for example, allow the communication device 120 to call a phone 152 on the PSTN or a PBX. An example of the call manager 112 is SESSIONSUITE™ from BlueNote Networks, Inc. of Tewksbury, Mass.

The branch office also includes a call manager 122, which provides the same functionality as the call manager 112, as well as a communication device 123 and a communication device 124. The data center and the branch office can be connected using a virtual private network (VPN). The communication device 122 of the data center 102 can communicate with the communication device 124 of the branch office by originating a call that is processed by the call manager 112, which sends the call to the call manager 122, which in turn, processes the call and sends it the communication device 124. The call manager 122 also allows the communication devices 123 and 124 to communicate with a phone 154 on the PSTN or a PBX.

The home office 106 can include a communication device 125 and a communication device 126. Communication is established between the communication devices 125 and 126 of the home office and other communications devices through an Internet connection such that the communication devices of the home office are connected to the server 110. In this manner, the communication devices 125 and 126 can originate and receive calls through the call manager 112.

The nomadic user 108 can have a communication device 127 that allows VoIP communication such that the communication device 127 can connect to the server 110. The nomadic user can originate and receive calls through the call manager 112.

Figure 2:
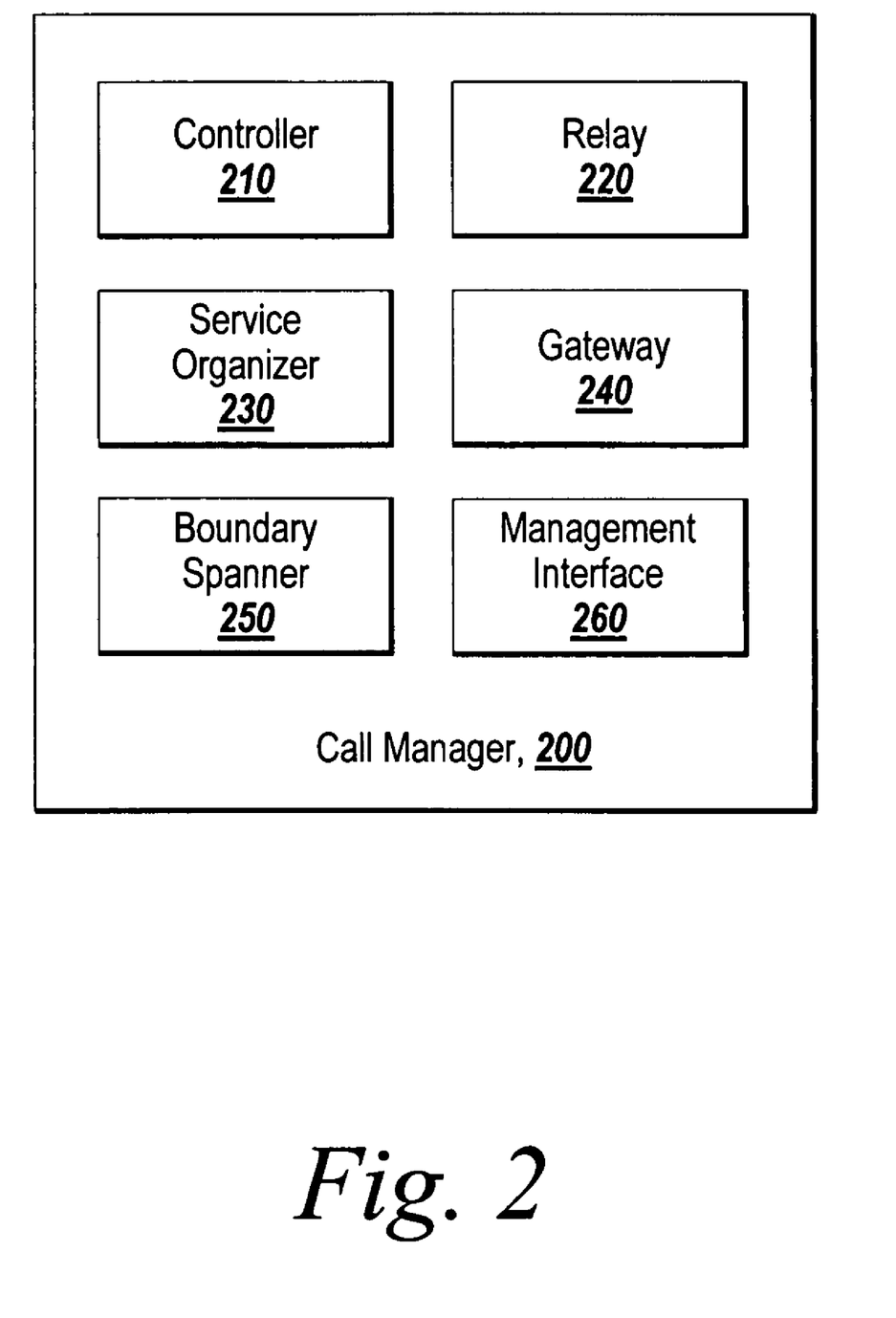
FIG. 2 depicts the call manager that is depicted in FIG. 1 in more detail.

FIG. 2 depicts the call managers 112 and 122 in more detail. For clarity, unless otherwise stated, the call managers 112 and 122 will hereinafter be commonly referred to as call manager 200. The call manager 112 includes a controller 210, a replay 220, a service organizer 230, a gateway 240, a boundary spanner 250 and a Management Interface 260. An example of the call manager 200 us SESSIONSUITE™.

The controller 210 supplies fundamental session initiation protocol (SIP) capabilities including, but not limited to SIP Proxy, SIP Redirector, and SIP Registrar functions. The controller 210 can be RFC 3261 compliant and can provide a standards-based core signaling and control infrastructure. The controller 210 provides advanced admission control capabilities allowing VoIP calls to be rejected if insufficient resources are available to complete a call with acceptable quality and can integrate directly with enterprise information technology (IT) infrastructure such as RADIUS AAA servers and LDAP policy servers, thereby, allowing voice to be treated and managed in a manner similar to other IP applications.

The relay 220 provides voice and video traffic forwarding and switching under the control of the controller 210. The relay 220 can supply compression and transcoding and can support a variety of CODECs including, but not limited to G.711 variants, G.729 variants, and GSM for voice; and H.263 and H.264 for video. The relay 220 oversees voice and video quality, and enforces quality of service and traffic management policies.

The service organizer 230 can be used in conjunction with the controller 210 and provides traditional voice calling and point-to-point video features as a pure software solution. The service organizer 230 can provide PBX calling functions along with value-added features such as voicemail, conference bridging, and Interactive Voice Response (IVR) and works with a wide variety of standards-based softphones, SIP phones, and traditional analog telephones.

The gateway 240 bridges VoIP networks and traditional PSTN/PBX infrastructures, allowing VoIP users to place and receive calls with PBX users or users of the PSTN network. The gateway 240 works with standards-based third party analog and digital line adapters, and supports a variety of interfaces including T1 CAS, ISDN PRI, and analog FXS/FXO.

The boundary spanner 250 enables flexible and integrated boundary solutions for NAT and firewall traversal. Modern enterprise networks are typically comprised of independent networks with unique address spaces. NAT devices are used to connect with external networks, while firewall technology is used to protect the local network from the outside world. The boundary spanner 250 can enable SIP-controlled communications flows through firewall and NAT boundaries. For example, the boundary spanner can traverse firewalls and NAT devices that separate a service provider from a service subscriber. The boundary spanner 250 can be used to extend corporate voice services to Internet-enabled mobile workers, or Internet-connected affiliates of an enterprise such as subsidiaries and suppliers. The boundary spanner 250 can provide connectivity and interoperability with external services, service providers and hosting facilities. The boundary spanner 250 can also provide additional naming and can identify features that allow enterprises to gain access to, use and manage external services.

The Management Interface 260 can be a Web-based application that manages the call manager 200 as well as services, resources, sessions, users and clients of the VoIP network 100. The Management Interface 260 can provide a common Web browser interface for managing all of the software components of the call manager, and offers integrated fault, configuration, performance and security management for all the call manager 200 functions. The Management Interface 260 can provide a user portal that allows subscribers of the services 230 to manage call handling and voicemail features through a secure Web browser. The Management Interface 260 can provide an XML/SOAP interface for integration with third-party or customer-developed management applications and systems.

As discussed above, the illustrative embodiment provides a software-based find-me service for a VoIP network. The ability for a user to make use of the find-me service is granted or assigned by an administrator. The find me service may be assigned on an enterprise, group, or individual basis.

When a user either originates or receives a call, many services may come into play on behalf of the user. For instance, if a callee receives a call from a caller, a permissions service may determine if the callee is allowed to receive a call from the caller. If so, the find-me service may subsequently be activated.

Figure 3A:
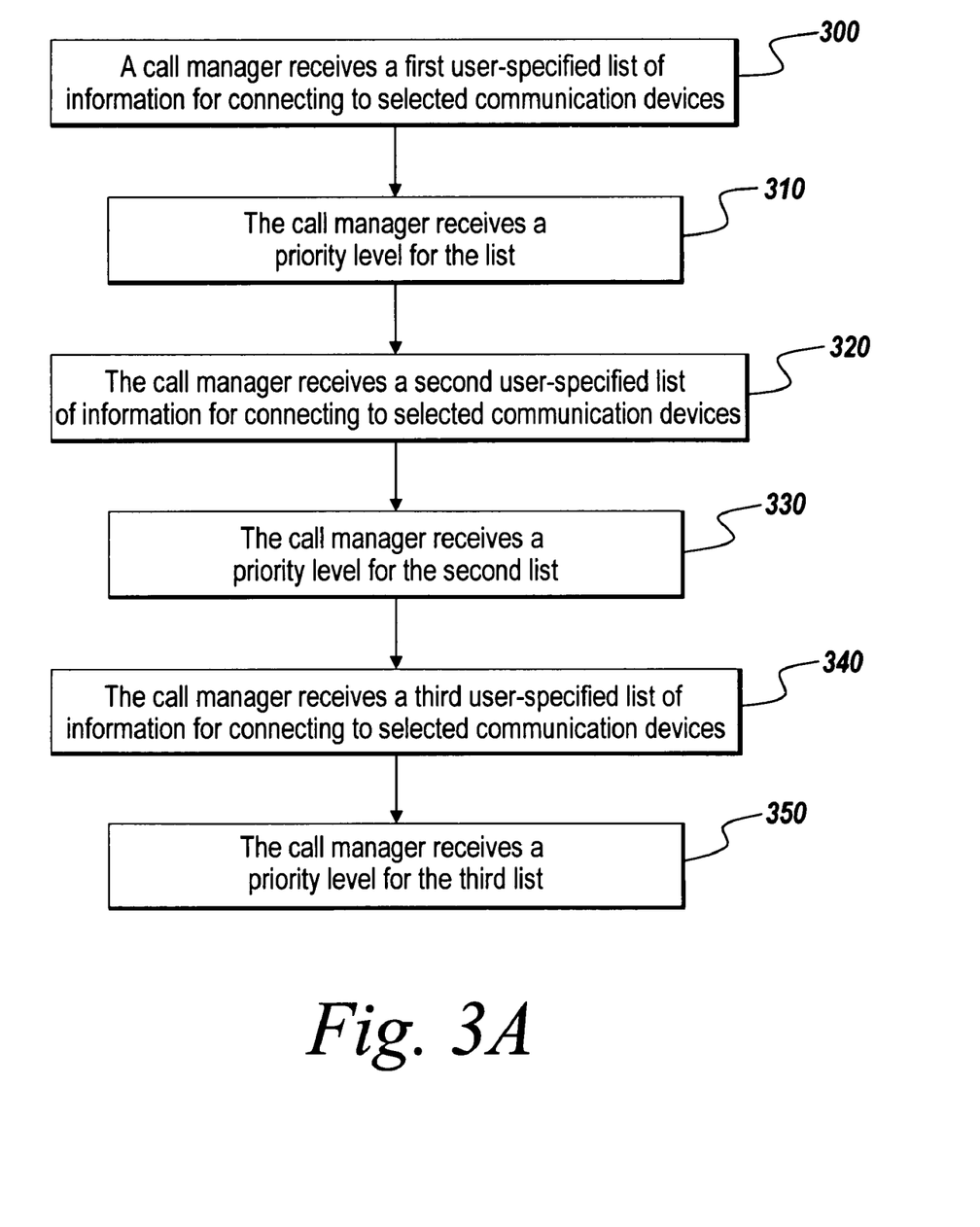
FIG. 3A is a flow diagram of the steps taken to setup the find-me service in accordance with one embodiment of the present invention that uses prioritized lists.

FIG. 3A is a flow diagram of the steps taken to setup the find-me service in one embodiment of the present invention. The call manager 112 receives information for connecting to a first list of communication devices (step 300) as specified by a user, and receives a user-specified priority level for the list (step 310). The information for connecting to the communication devices can include, but is not limited to an alias for the communication device or user, a user ID and/or an IP address. The list can include any number of communication devices. The communication devices can be geographically separated or in the same geographical location. For example, the user may use the communication device 120 and 121 located at the data center 102 as well as the communication device 123 at the branch office 104. The user can specify the communication device 120, 121 and 123 in the first list.

The call manager 112 can also receive a second user-specified list of communication devices (step 320), and can receive a user-specified priority level for the second list (step 330). The second list can include any number of communication devices. The user, for example, may only include the communication device 127, which provides the user with mobile communications ability.

The call manager 112 can further receive a third user-specified list of communication devices (step 340). The third user-specified list of communication devices received by the call manager 112 can have a user-specified priority level (step 350) and can include any number of communication devices in the third list. For example, the user can include the communication device 125 and 126 in the third list.

The priority levels assigned to the first, second and third lists by the user are each unique. For example the user can assign a priority level of 1 to the first list, priority level of 2 to the second list and a priority level of 3 to the third list, where 1 represents the highest priority and 3 represents the lowest priority.

Figure 3B:
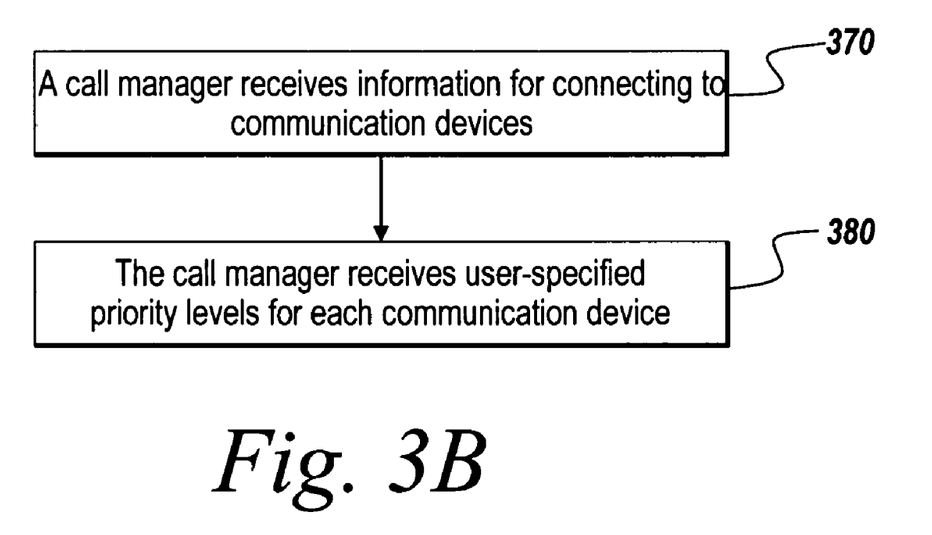
FIG. 3B is a flow diagram of the steps taken to setup the find-me service in accordance with another embodiment of the present invention that assigns each communication device a priority.

FIG. 3B is a flow diagram of the steps taken to setup the find-me service for one embodiment of the present invention. The call manager 112 receives information for connecting to communication devices, as specified by a user (step 370). The information for connecting to the communication devices can include, but is not limited to an alias for the communication device or user, a user ID and/or an IP address. The call manager 112 receives, from the user, a specified priority level for each of the communication devices (step 380). The user may specify the same priority level for more than one communication device. For example, the user may specify that the communication devices 120 and 123 have the highest priority, while communication device 127 has the next highest priority level and the communication device 125 has the lowest priority level. The communication devices can be geographically separated or in the same geographical location. For example, the user may use the communication device 120 and 121 located at the data center 102 as well as the communication device 123 at the branch office 104. The user can specify the communication device 120, 121 and 123 in the first list.

Figure 4:
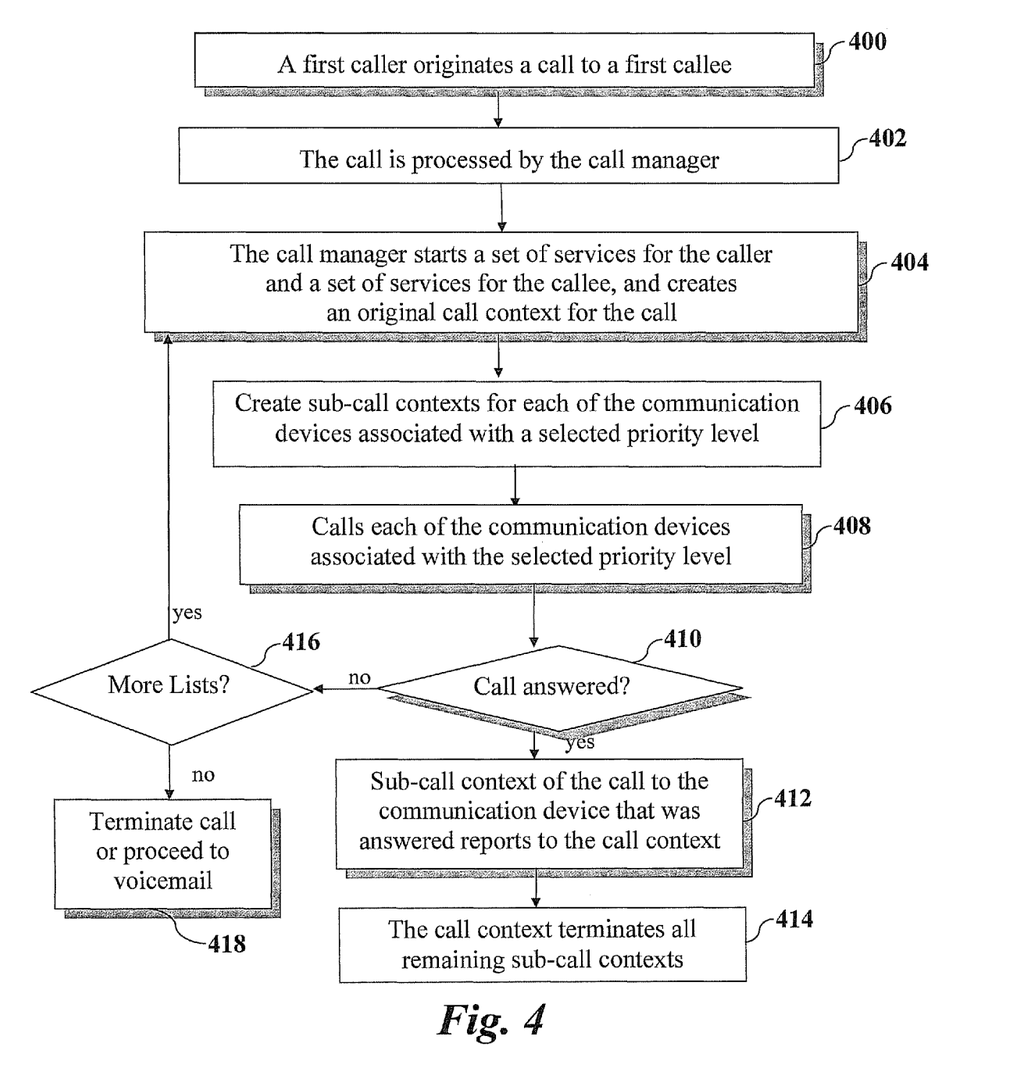
FIG. 4 is a flow diagram of the steps taken to implement the find-me service of the illustrative embodiment.

FIG. 4 is a flow diagram of the steps taken to implement the find-me service. A first caller originates a call to a first callee (step 400). At this time, the call is processed by the call manager 112 (step 402). The call manager 112 creates an original call context for the call and starts a set of services for the caller and a set of services for the callee (step 404). For example, the caller may have a caller ID service enabled such that the caller ID service can change the name displayed to the user from the caller's name to the name of the caller's company and the callee may have the find-me service enabled.

Figure 5:
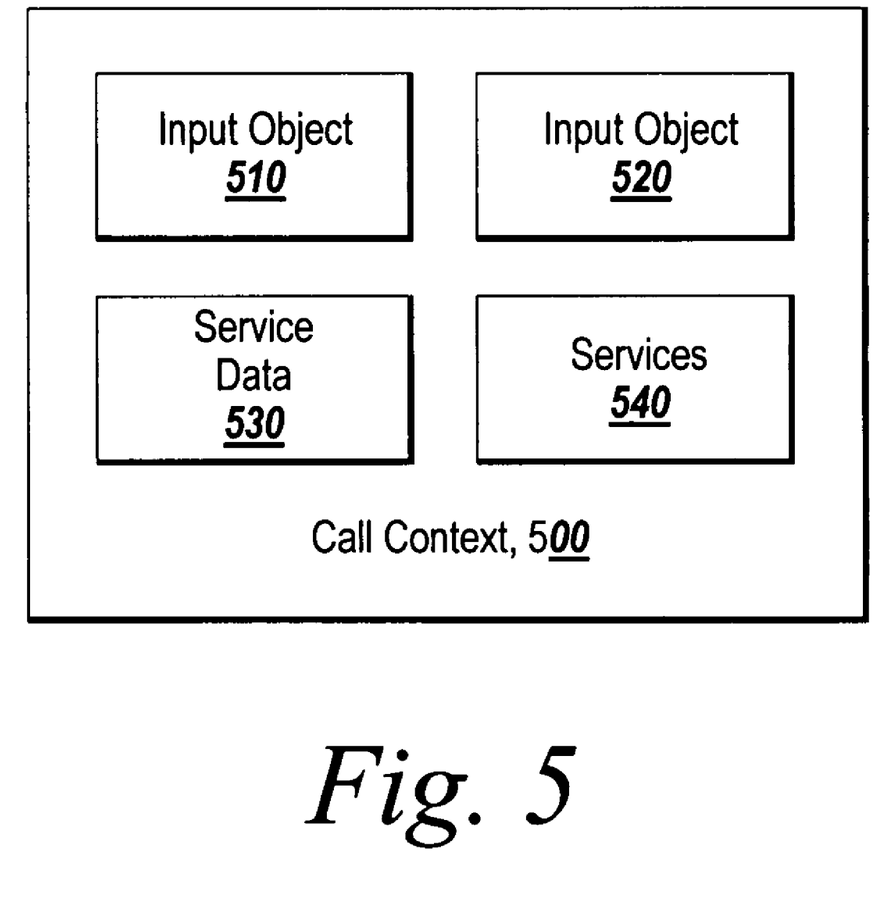
FIG. 5 is a graphical representation of an exemplary call context in accordance with the illustrative embodiment.

FIG. 5 is a graphical depiction of an exemplary call context 500 in accordance with the illustrative embodiment. The call context 500 is an object in a programming language, such as C++ and includes an input object 510, an output object 520 and service data 530 for each service assigned to the call. The call context 500 also maintains the services 540, which are derived from a service class. The input and output objects 510 and 520 work together to setup and tear down calls. The service data can be, but is not limited to data that is used by the services for implementation of the services, such as call events, service identifications, and service priority information.

After the find-me service is initiated, the call manager creates sub-call contexts, which are related to the original call context for the call, for each of the communication devices with the highest priority level specified by the user or for each communication device in the list of communication devices that has the highest priority level (step 406). The original call context can be referred to as a parent call context and the sub-call contexts can each be referred to as a child call context. The child call context is similar to the parent call context, but includes a subset of services to be implemented. Some services are implemented once in the parent context and are not passed to the children call contexts. The call manager calls each of the communications devices with the highest priority or each communication device in the list of communication devices that has the highest priority (step 408). For example, the call manager creates children call contexts for and calls all of the communication devices in the first list of communication devices. The communication devices 120, 121 and 123, therefore receive a call from the caller. If the call is answered (step 410), the child context of the call to the communication device that was answered reports to the parent call context (step 412). The call manager may apply a time out period such that if the communication devices are not answered in a specified amount of time the call manager continues the process by proceeding to the communication devices with the next highest priority level or to the list of communication devices with the next highest priority level. Upon receiving the report from the child context that the call has been answered, the call context terminates all remaining children call contexts (step 414).

If, however, the callee does not answer the call to any of the communication devices that are called in parallel (step 410), the call manager checks for additional communication device with the next highest priority or for an additional list of communication devices with the next highest priority (step 416). If there are more communication devices or lists of communication device the call manager repeats the process starting at step 406, otherwise the call manager can either terminate the call or transfer the call to a voice mail service or any other service that may be interested in processing the call (step 418). For example, the call manager creates children call contexts for each of the communication devices with the next highest priority or for each communication device in the list of communication devices that has the next highest priority level (step 406). The call manager subsequently calls each of the communications devices (step 408). For example, the call manager creates children call contexts for and calls all of the communication devices in the second list of communication devices. The communication device 127, therefore, receives a call from the caller. If the call is answered (step 410), the child context of the call to the communication device that was answered reports to the parent call context (step 412). Upon receiving the report from the child context, the parent call context terminates all remaining children call contexts (step 414).

If, however, the callee does not answer the call to any of the communication devices that are called (step 410), the call manager repeats step 418 and continues the process. For example, additional communication devices may have been specified, by the user, that have the next highest priority or an additional list of communication devices may have been specified. The call manager creates children call contexts for each of the communication devices with the next highest priority or for each communication device in the list of communication devices that has the next highest priority level (step 406). The call manager subsequently calls each of the communications devices (step 408). For example, the call manager creates children call contexts for and calls all of the communication devices in the third list of communication devices. The communication devices 125 and 126, therefore, receive a call from the caller. If the call is answered (step 410), the child context of the call to the communication device that was answered reports to the parent call context (step 412). Upon receiving the report from the child context, the parent call context terminates all remaining children call contexts (step 414).

The process described above repeats for as many lists of communication devices that are specified. In the event that the call is not answered before a time out period and there are no more communication devices or lists of communication device, the call may be terminated or may proceed to the callee's voice mail service.

While the children call contexts described above are generated sequential as the call manager processes each priority level, one skilled in the art will recognize that other implementations are possible. For example, the children call contexts for each of the specified communication device can be created initially before the call manager begins the calling process.

It is observed from the discussion above that the find-me service of the illustrative embodiment of the present invention provides flexibility for a user by allowing the call manager to receive specified communication devices with assigned priorities or prioritized lists of communication devices such that the call manager can call multiple communication devices in parallel as well as sequentially.

Certain embodiments of the present invention are described above. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method in a VoIP network, the method comprising the steps of:
    receiving information for connecting to a plurality of communication devices of a user, wherein each communication device is assigned an associated priority level;
    creating a call context object for on originating call including an input object and an output object, and creating a sub-call context object for each communication device with a first priority;
    initially calling, in parallel, each communication device with an identical first priority level, upon the origination of the originating call to the user;
    waiting for the user to answer the initial call with a communication device that is initially called and of the initial call is answered, the sub-call context object of the communication device that was answered reporting to the call context object, and the call context object terminating the sub-call context objects; and
    calling each communication device with an identical second priority level if the call is not answered by a communication device that is initially called.

2. The method of claim 1, wherein the information for connection to a plurality of communication devices is separated into lists and the priority level of each communication device is assigned based on a priority level of each list.

3. The method of claim 1, wherein the user assigns a priority level to each communication device.

4. A non-transitory computer-readable medium holding computer executable instructions in a VoIP network, the instructions, when executed, implementing a method comprising
- receiving information for connection to a plurality of communication devices of a user, wherein each communication device is assigned an associated priority level;
- creating a call context object for an originating call, and creating a sub-call context object for each communications device having a first priority;
- initially calling, in parallel, each communication device with an identical first priority level, upon the origination of the originating call to the user;
- waiting for the user to answer the initial call with a communication device that is initially called and if the initial call is answered, the sub-call context object of the communication device that was answered reporting to the call context object, and the call context object terminating remaining sub-call context objects; and
- calling each communication device with an identical second priority level if the call is not answered by a communication device that is initially called.

5. A system in a VoIP environment, the system comprising
- a computing device with an application loaded on it for receiving information for connecting to a plurality of communication devices, each communication device being assigned an associated priority level,
- wherein the application is operable to create a call context object for an originating call, to create a sub-call context object for each communication device, to call each communication device with an identical priority level in parallel upon origination of the originating call and to call each communication device with a different priority level sequentially and wherein, if one of the calls is answered, the sub-call context object for the communication device that was answered reports to the call context object, and the call context object terminates remaining sub-call context objects; and
- calling each communication device with an identical second priority level if the call is not answered by a communication device that is initially called.

6. A computer-implemented method in a VoIP network, the method comprising the steps of:
- obtaining information for connection to a plurality of communication devices of a callee; receiving an originated call from a caller to the callee;
- processing the call to create a parent call context that contains information corresponding to the originated call including an input object, and output object and service data;
- creating a child call context for each communication device having a highest priority, the child contexts including a subset of services to be implemented; and
- calling each communication device having the highest priority and if one of the called communication devices answers, the child context for the answering communication device reporting to the parent call context and the parent call context terminating all remaining child call contexts in response to the reporting; and
- calling each communication device with an identical second priority level if the call is not answered by a communication device that is initially called.

7. A non-transitory computer-readable medium holding computer executable instructions in a VoIP network, the instructions, when executed, implementing a method comprising
- obtaining information for connecting to a plurality of communication devices of a callee;
- receiving an originated call from a caller to the callee;
- processing the call to create a parent call context that contains information corresponding to the originated call;
- creating a child call context for each communication device having a highest priority, the child contexts providing information corresponding to a subset of services to be implemented; and
- calling each communication device having the highest priority and if one of the called communication devices answers, the child context for the answered communication device reporting to the parent call context and the parent call context terminating remaining child contexts in response to the child context reporting; and
- calling each communication device with an identical second priority level if the call is not answered by a communication device that is initially called.

8. The medium of claim 7 wherein the method further comprises creating a child call context for each communication device for a next highest priority if none of the communication devices of the highest priority answer within a specified time after being called.

* * * * *